United States Patent
Yuan (10) Patent No.: US 12,462,446 B2
(45) Date of Patent: Nov. 4, 2025

(54) METHOD, APPARATUS, ELECTRONIC DEVICE AND STORAGE MEDIUM FOR IMAGE GENERATION

(71) Applicant: Beijing Zitiao Network Technology Co., Ltd., Beijing (CN)

(72) Inventor: Qi Yuan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/933,926

(22) Filed: Oct. 31, 2024

(65) Prior Publication Data
US 2025/0139844 A1 May 1, 2025

(30) Foreign Application Priority Data
Oct. 31, 2023 (CN) .......................... 202311435766.8

(51) Int. Cl.
*G06T 11/00* (2006.01)
*G06T 11/60* (2006.01)

(52) U.S. Cl.
CPC ................................. *G06T 11/00* (2013.01)

(58) Field of Classification Search
CPC ................................ G06T 11/00; G06T 11/60
USPC ....................................................... 345/619
See application file for complete search history.

(56) References Cited

U.S. PATENT DOCUMENTS

| 10,685,057 | B1* | 6/2020 | Chavez | G06F 16/248 |
| 2006/0082579 | A1* | 4/2006 | Yao | G06T 11/00 345/473 |
| 2011/0184737 | A1* | 7/2011 | Nakano | G10L 15/12 704/254 |
| 2011/0235905 | A1* | 9/2011 | Yokokawa | H04N 1/40068 382/165 |
| 2018/0357800 | A1* | 12/2018 | Oxholm | G06T 11/001 |
| 2020/0410730 | A1* | 12/2020 | Wilensky | G06T 7/0002 |
| 2021/0382936 | A1* | 12/2021 | Tomar | G06N 20/00 |
| 2022/0067421 | A1* | 3/2022 | Zhang | G06F 16/5866 |
| 2022/0076374 | A1* | 3/2022 | Li | G06T 3/10 |

FOREIGN PATENT DOCUMENTS

CN 116188250 A 5/2023

\* cited by examiner

*Primary Examiner* — Yi Yang
(74) *Attorney, Agent, or Firm* — Astute IP Law Group (57) ABSTRACT

The embodiment of the invention provides a method and apparatus for image generation, an electronic device and a storage medium. The method includes: in response to a triggering operation for image effect processing, performing effect processing on a to-be-processed image to obtain an effect image; in response to a style type of the effect image being the same as a used style type of an effect image generated last time, determining at least one to-be-selected style type based on a predetermined style probability distribution; determining a target style type based on the at least one to-be-selected style type; and in response to the triggering operation for the image effect processing being detected, processing the to-be-processed image into an effect image matching the target style type.

14 Claims, 2 Drawing Sheets

METHOD, APPARATUS, ELECTRONIC DEVICE AND STORAGE MEDIUM FOR IMAGE GENERATION

CROSS REFERENCE

This application claims priority to Chinese Patent Application No. 202311435766.8, filed on Oct. 31, 2023, and entitled "METHOD, APPARATUS, ELECTRONIC DEVICE AND STORAGE MEDIUM FOR IMAGE GENERATION," the entirety of which is incorporated herein by reference.

FIELD

The embodiment of the present disclosure relates to the technical field of effect processing, and in particular to a method, an apparatus, an electronic device and storage medium for image generation.

BACKGROUND

With the development of network technologies, more and more applications have entered life of users, especially a series of software capable of shooting short videos are very popular among users.

In the prior art, software developers may add various effect items to applications for users to use in the process of shooting videos. However, the effect items currently provided for users are very limited, and both quality of the videos and richness of contents thereof need to be further improved, especially when stylized effect processing is performed on images based on effect items containing a plurality of style types, if only a plurality of random styles are used, the following problem may occur: the user repeatedly experiences the same effect due to that the style types used consecutively may be the same, and thus the usage experience of the user is affected.

SUMMARY

The embodiment of the present disclosure provides a method, an apparatus, an electronic device and storage medium for image generation, so as to achieve an effect of keeping original predetermined style probability distribution differences unchanged as much as possible while performing effect processing on images by adopting different style types for multiple consecutively times.

According to a first aspect, an embodiment of the present disclosure provides a method for image generation, including:
  in response to a triggering operation for image effect processing, performing effect processing on a to-be-processed image to obtain an effect image;
  in response to a style type of the effect image being the same as a used style type of an effect image generated last time, determining at least one to-be-selected style type based on a predetermined style probability distribution;
  determining a target style type based on the at least one to-be-selected style type; and
  upon detecting the triggering operation for the image effect processing, processing the to-be-processed image into an effect image matching the target style type.

According to a second aspect, an embodiment of the present disclosure further provides an apparatus for image generation, including:
  an image processing module configured to perform, in response to a triggering operation for image effect processing, effect processing on a to-be-processed image to obtain an effect image;
  a to-be-selected style type determining module configured to determine, in response to a style type of the effect image being the same as a used style type of an effect image generated last time, at least one to-be-selected style type based on a predetermined style probability distribution;
  a target style type determining module configured to determine a target style type based on the at least one to-be-selected style type; and
  an effect image determining module configured to process, upon detecting the triggering operation for the image effect processing, the to-be-processed image into an effect image matching the target style type.

In a third aspect, an embodiment of the present disclosure further provides an electronic device, including:
  one or more processors;
  a storage device configured to store one or more programs,
  when the one or more programs are executed by the one or more processors, the one or more processors implement the method for image generation according to any one of the embodiments of the present disclosure.

According to a fourth aspect, an embodiment of the present disclosure further provides a storage medium including computer-executable instructions, where the computer-executable instructions are configured to perform, when executed by a computer processor, the method for image generation according to any one of the embodiments of the present disclosure.

According to the technical solution of the embodiment of the present disclosure, effect processing is performed on a to-be-processed image in response to the triggering operation for image effect processing to obtain the effect image, and further, if the effect image and a previously generated effect image have the same used style type, at least one to-be-selected style type is determined based on a predetermined style probability distribution; and a target style type is determined based on the at least one to-be-selected style type; and then, when the triggering operation for the image effect processing is detected, the to-be-processed image is processed into the effect image matching with the target style type. Therefore, the following problem in the prior art is solved: the user repeatedly experiences the same effect since the style types used consecutively may be the same, and thus the user may experience the same effect repeatedly; and when performing effect processing on an image for multiple consecutively times, the effect of adopting different style types for performing effect processing on images is realized, and then the richness and diversity of the effect image are improved. Meanwhile, the effect of keeping the original predetermined style probability distribution unchanged on the basis of randomly generating effect images of various style types is also realized.

BRIEF DESCRIPTION OF DRAWINGS

The above and other features, advantages and aspects of embodiments of the present disclosure will become more apparent with reference to the following detailed description taken in conjunction with the accompanying drawings.

Throughout the drawings, the same or similar reference numerals denote the same or similar elements. It should be understood that the drawings are schematic and that elements and elements are not necessarily drawn to scale.

DETAILED DESCRIPTION

Embodiments of the present disclosure will be described in more detail below with reference to the accompanying drawings. While some embodiments of the present disclosure are shown in the drawings, it shall be understood that the present disclosure can be implemented in various forms and should not be construed as limited to the embodiments set forth herein. On the contrary, these embodiments are provided for a more thorough and complete understanding of the present disclosure. It shall be understood that the drawings and embodiments of the present disclosure are provided for illustrative purposes only and are not intended to limit the scope of protection of the present disclosure.

It shall be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different devices, modules, or units, but are not used to limit the order or interdependence of the functions performed by these devices, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of messages or information exchanged between multiple devices in the implementations of the present disclosure are described for illustrative purposes only, but are not intended to limit the scope of these messages or information.

It will be appreciated that, before using the technical solutions disclosed in the various embodiments of the present disclosure, the user shall be informed of the type, application scope, and application scenario of the personal information involved in this disclosure in an appropriate manner and the user's authorization shall be obtained, in accordance with relevant laws and regulations.

For example, in response to receiving an active request from a user, a prompt message is sent to the user to explicitly prompt the user that the operation requested to be performed will require acquiring and using personal information of the user. Thus, the user can autonomously select whether to provide personal information to software or hardware such as electronic devices, applications, servers, or storage media that perform operations of the disclosed technical solution, based on the prompt message.

As an optional but non-limiting implementation, in response to receiving an active request from the user, prompt information is sent to the user, for example, in the form of a pop-up window, and the pop-up window may present the prompt information in the form of text. In addition, the pop-up window may also carry a selection control for the user to select whether he/she "agrees" or "disagrees" to provide personal information to the electronic device.

It can be understood that the above notification and user authorization process are only illustrative which do not limit the implementation of this disclosure. Other methods that meet relevant laws and regulations can also be applied to the implementation of this disclosure.

It can be understood that data involved in this technical solution (including but not limited to the data itself, acquisition or use of the data) should comply with the requirements of corresponding laws, regulations and relevant provisions.

Before the present technical solution is described, an application scenario may be first exemplarily described. When an input source of an effect production is a dynamic video frame, the effect added to the effect action object in the dynamic video frame may move along with the movement of the effect action object, and in this case, in the related art, it is difficult to match an effect selection box drawn by using the predetermined parameter with the selected effect. Moreover, the related art does not support editing the effect in the scene of the dynamic video frame, so that the user cannot preview display effect of the effect at multiple angles in a process of editing effect, and the use experience of the user is affected.

Before the present technical solution is described, an application scenario may be first exemplarily described. The technical solutions of the embodiments of the present disclosure may be applied to a scenario in which an effect image is generated based on an effect item including multiple style types (for example, an artificial intelligence generated effect item). Exemplarily, when a triggering operation for image effect processing is detected, the triggering operation may be responded, and the effect processing is performed on a to-be-processed image based on the corresponding effect item, to obtain an effect image. In the related art, when performing effect processing on the to-be-processed image, one style type is usually randomly selected from a plurality of style types contained in the effect item, and the effect processing is performed on the to-be-processed image based on the selected style type. Further, if a triggering operation for the image effect processing is detected again, a style type is randomly determined from the plurality of style types again, to perform effect processing on the to-be-processed image based on the style type. Performing the effect processing on an image based on the foregoing manner may have a problem that the style types used consecutively may be the same, and thus the user may experience the same effect repeatedly. In this case, based on the technical solution of the embodiment of the present disclosure, after the effect image is obtained, it may be determined whether the style type used by the effect image is the same as the used style type of the effect image generated last time. If it is determined that the two corresponding style types are the same, at least one to-be-selected style type is determined based on a predetermined style probability distribution representing a probability distribution condition of respective style types, and a target style type is determined based on the at least one to-be-selected style type, and further, when a triggering operation for the image effect processing is detected, the to-be-processed image is processed into an effect image matching the target style type. Therefore, when the effect processing is performed on the image for multiple times consecutively, the effect of performing effect processing on the image by adopting different style types can be achieved, so that the richness and diversity of the effect image are improved, and the use experience for the effect item is improved.

Before the present technical solution is described, it should be noted that the apparatus for performing the image generation method provided in the embodiments of the present disclosure may be integrated into application software that supports an image generation function, and the software may be installed in an electronic device, and optionally, the electronic device may be a mobile terminal or a PC terminal, etc. The application software may be a type of software that performs effect processing on images, and the specific application software thereof is not described herein again, as long as image generation can be implemented. It may also be a specially developed application program, which is integrated in software for implementing effect element processing, or integrated in a corresponding page, and the user may perform effect processing on an image through a page integrated in the PC terminal, to generate the effect image.

Figure 1:
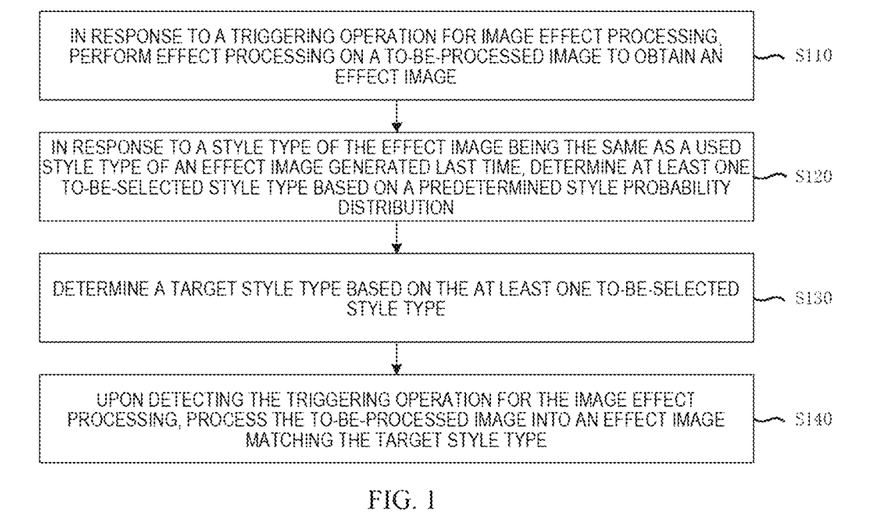
FIG. 1 is a schematic flowchart of a method for image generation according to an embodiment of the present disclosure.

FIG. 1 is a schematic flowchart of a method for image generation provided by an embodiment of the present disclosure, the embodiment of the present disclosure is applicable to a case in which effect processing is performed on an image based on an effect item containing multiple style types, the method may be performed by an apparatus for image generation, the apparatus may be implemented in a form of software and/or hardware, optionally, implemented by an electronic device, and the electronic device may be a mobile terminal, a PC terminal, a server, or the like.

As shown in FIG. 1, the method in this embodiment may specifically include:

S110, in response to a triggering operation for image effect processing, performing effect processing on a to-be-processed image to obtain an effect image.

In this embodiment, in application software or applications supporting an effect processing function, a control for triggering an effect may be developed in advance. Further, when it is detected that the user triggers the control, the triggering operation may be responded. Therefore, the to-be-processed image is obtained, and the effect processing is performed on the to-be-processed image to obtain the effect image.

The to-be-processed image may be an image on which effect processing needs to be performed. Optionally, the to-be-processed image may be an image collected based on the terminal device, or may be an image acquired by the application software from images pre-stored in the storage space. The terminal device may be an electronic product having an image shooting function, such as a camera, a smart phone, and a tablet computer. In practical applications, when it is detected that the user triggers an effect operation, the terminal device may collect a to-be-processed image for the effect action object; or when it is detected that the user triggers the effect operation, a plurality of images associated with the effect are determined from a specific database, and then one or more images may be determined as the to-be-processed images according to a predetermined screening rule.

In practical applications, only when some effect operations are triggered, the to-be-processed image may be obtained, and then effect processing is performed on the to-be-processed image. Optionally, the effect triggering operation may include at least one of the following: triggering an effect item; triggering an effect wake-up word by using audio information; and determining that a current body movement is consistent with a predetermined body movement.

In this embodiment, a control for triggering effect items may be predetermined, and when a user triggers the control, an effect item display interface may be popped up in the display interface, and a plurality of effect items may be shown on the display interface. The user may trigger the corresponding effect item, and when it is detected that the user triggers an effect item corresponding to the to-be-processed image, it may indicate that the effect triggering operation is triggered. In another implementation, audio information of a user may be collected in advance, and the collected audio information is analyzed and processed. Further, text corresponding to the audio information may be identified, and if the identified text includes predetermined wake-up words, for example, the wake-up words may be a type of words such as "Please shoot a current image" or "Please enable an XX effect function", it indicates that the to-be-processed image in the display interface can be obtained. In another implementation, some body movements may be predetermined as effect triggering movements, and when it is detected that a body movement currently performed by an effect action object in a field of view of the terminal device is consistent with a predetermined body movement, it may be determined that an effect operation is triggered. Optionally, the predetermined body movement may be lifting a hand, opening a mouth, or rotating a head.

In this embodiment, when the to-be-processed image is obtained, the effect processing may be performed on the to-be-processed image to obtain an effect image. The effect image may be understood as an image shown on the display interface after the to-be-processed image is processed by the effect item. The effect presented by the effect image corresponds to the effect item applied thereto.

In practical applications, when a triggering operation for the image effect processing is detected, an image to be processed may be obtained. Then, the effect processing may be performed on the to-be-processed image to obtain an effect image. It should be noted that, in a case that the triggered effect item is an effect item that contains multiple style types, when the effect processing is performed on the to-be-processed image, a style type is usually randomly selected, and then the effect processing may be performed on the to-be-processed image according to the style type to obtain the effect image. It should be noted that the plurality of style types may be at least three style types.

In the embodiments of the present disclosure, in order to make the fitness between the finally obtained effect image and the to-be-processed image higher, and make the effect fusion degree for the target object in the image to be processed higher, attribute analysis may be performed on the target object in the to-be-processed image after the to-be-processed image is obtained. Further, an effect style type matching the target object may be determined from a plurality of predetermined style types according to the attribute analysis result. Therefore, the effect processing may be performed on the to-be-processed image based on the effect style type to obtain the effect image.

Optionally, performing the effect processing on the to-be-processed image to obtain the effect image includes: retrieving a predetermined style probability distribution corresponding to a target object in the to-be-processed image according to an object attribute of the target object; and determining an effect style type corresponding to the to-be-processed image according to the predetermined style probability distribution, and performing the effect processing on the to-be-processed image based on the effect style type to obtain the effect image.

The target object may be an object in the to-be-processed image on which effect processing needs to be performed. Optionally, the target object may be a person, a pet, a building, or the like. It should be noted that the to-be-processed image may include one or more objects. In a case that the to-be-processed image includes one object, the object may be used as the target object; and in a case that the to-be-processed image includes a plurality of objects, one object is determined from the plurality of objects according to a predetermined target object determining logic or a selection triggering operation from the user, and the determined object is used as the target object. The object attribute may be understood as information representing a physiological characteristic attribute of the object. The object attribute may be an external feature attribute of the object that presented on the image. The predetermined style probability distribution may be used to represent a probability information distribution rule of each style type. In the embodiment of the present disclosure, the predetermined style probability distribution may include probability information of a plurality of style types, and the style types included are determined in advance. In practical applications, when producing an effect item, a plurality of style types deployed in the effect item may be predetermined. Further, a plurality of different object attributes may be determined, and data statistics are performed for the object attributes and the style types to determine usage probabilities corresponding to respective style types under each object attribute, where the probability information may be used to indicate a possibility of applying the style type under the corresponding object attribute. A style probability distribution is constructed according to the possibilities corresponding to the style types, and the style probability distribution may be used as the predetermined style probability distribution corresponding to the object attribute. Further, predetermined style probability distributions corresponding to various object attributes may be obtained, an association relationship between the object attributes and the predetermined style probability distributions is constructed, and the association relationship is stored in the terminal device.

It should be noted that, when constructing the predetermined style probability distribution, it needs to be ensured that a sum of a plurality of style probability distributions is 1, that is, it is ensured that the addition of probability information corresponding to respective style types in the predetermined style probability distribution equals to 1. When the total number of style types is small, data analysis may be performed on the usage data of each style type under the obtained object attribute, and then probability information corresponding to each style type may be obtained, and it may be ensured that after all the probability information is added, the sum is equal to 1. For example, it is assumed that there are 6 style types, which are respectively style type 1, style type 2, style type 3, style type 4, style type 5, and style type 6. After data analysis, it may be obtained that probability information corresponding to the style type 1 is 0.1, probability information corresponding to the style type 2 is 0.15, probability information corresponding to the style type 3 is 0.21, probability information corresponding to the style type 4 is 0.19, probability information corresponding to the style type 5 is 0.25, and probability information corresponding to the style type 6 is 0.1. In this case, 1 may be obtained after adding all the probability information corresponding to the 6 style types.

When the total number of the style types is relatively large, after data analysis is performed on the usage data of each style type under the obtained object attribute and the probability information corresponding to respective style types is obtained, it may not be ensured that the sum of all the probability information equals to 1. In this case, weighting and normalization processing may be performed on respective pieces of probability information, so that a sum of the probability information obtained after the processing is 1. Then, a corresponding predetermined style probability distribution may be constructed according to the processed probability information.

In practical applications, after the to-be-processed image is obtained, target object detection may be performed on the to-be-processed image to determine a target object in the to-be-processed image. Further, object attribute identification may be performed on the target object to determine an object attribute of the target object presented in the to-be-processed image. Further, a predetermined association relationship between the object attribute and the style probability distribution may be traversed according to the object attribute of the target object, to retrieve the predetermined style probability distribution corresponding to the target object. Further, probability information analysis may be performed on the predetermined style probability distribution, the target style probability is determined based on the predetermined style probability distribution, and the style type corresponding to the target style probability is used as the effect style type corresponding to the to-be-processed image. Further, the effect processing may be performed on the to-be-processed image based on the effect style type, so that the effect presented by the finally obtained effect image matches the effect corresponding to the effect style type.

S120, in response to a style type of the effect image being the same as a used style type of an effect image generated last time, determining at least one to-be-selected style type based on a predetermined style probability distribution.

The effect image generated last time may be an image obtained after the effect processing is performed on the to-be-processed image last time. For example, assuming that the currently obtained effect image is an image obtained after performing the effect processing on the to-be-processed image for the third time, the effect image generated last time may be an image obtained after performing the effect processing on the to-be-processed image for the second time. The used style type may be understood as an effect style type used when performing the effect processing on the to-be-processed image. The to-be-selected style type may be understood as a candidate style type, that is, an effect style type to-be-selected for use. It should be noted that the at least one to-be-selected style type does not include the used style type.

In the related art, for an effect item including a plurality of effect style types, the effect processing is performed on a same to-be-processed image based on the effect item. Since an object attribute of a target object in the to-be-processed image does not change, there may be a problem that the to-be-processed image is processed by using the same effect style type consecutively for multiple times, so that a user repeatedly experiences the same effect. Based on this, by applying the technical solution provided by the embodiment of the present disclosure, after the effect image is obtained, the used style type corresponding to the effect image may be determined. Further, the used style type corresponding to the effect image may be compared with the used style type corresponding to the effect image generated last time. Further, if it is detected that the used style types of the effect image generated this time is the same as the effect image generated last time, the predetermined style probability distribution corresponding to the target object may be retrieved again, and at least one to-be-selected style type different from the used style type is determined based on the predetermined style probability distribution.

In practical applications, determining at least one to-be-selected style type based on the predetermined style probability distribution may include first determining probability information corresponding to each of the to-be-used style types and the used style type according to the predetermined style probability distribution. Further, a probability difference between the used style type and at least one to-be-used style type other than the used style type may be determined, to obtain a probability difference corresponding to each of the at least one to-be-used style type. Then, the probability differences may be screened according to a predetermined style type screening condition, so as to screen out a probability difference satisfying the predetermined style type screening condition. Further, a to-be-used style type corresponding to the screened probability difference may be used as the to-be-selected style type. Thus, at least one to-be-selected style type may be determined. It should be noted that the advantage of using the probability difference to perform style type screening is that the to-be-selected style type may be another effect style type closest to the used style type probability. Since the used style type is an effect style type determined based on the object attribute of the target object, and the effect style type may be a predetermined style type with a highest matching degree with the target object, among respective to-be-used style types, in order to ensure that the determined to-be-selected style type is an effect style type other than the used style type that relatively meets user requirements and has a relatively high fitness with the target object, each of the to-be-used style types may be screened based on the probability information to determine at least one to-be-selected style type.

It should be noted that after a plurality of effect images are generated by using the technical solutions provided in the embodiments of the present disclosure, the generated style probability distribution is almost consistent with the original predetermined style probability distribution, that is, in the process of generating the effect images, the original predetermined style probability distribution difference is kept unchanged as much as possible.

S130: determining a target style type based on the at least one to-be-selected style type.

In this embodiment, after the at least one to-be-selected style type is determined, screening may be performed on the at least one to-be-selected style type to determine the target style type. The target style type may be a finally applied effect style type.

It should be noted that there may be one or more determined to-be-selected style types. If there is one to-be-selected style type, the to-be-selected style type may be used as the target style type; if there are a plurality of to-be-selected style types, the target style type may be determined from the plurality of to-be-selected style types.

In practical applications, there may be at least two ways in determining the target style type from the plurality of to-be-selected style types. One may be: determining the target style type based on a triggering operation on any one of to-be-selected style types.

In a specific implementation, after the plurality of to-be-selected style types are obtained, each of the to-be-selected style types may be shown in the display interface, so that the user may select from the plurality of to-be-selected style types through a triggering operation. When a triggering operation of the user on any one of the to-be-selected style types is detected, the to-be-selected style type that is currently selected may be used as the target style type.

Another way may be randomly determining a target style type from a plurality of to-be-selected style types.

In this embodiment, the random determination may be arbitrary. Optionally, the random determination may be determination based on type identifiers corresponding to respective to-be-selected style type; or may be determination based on probability information corresponding to respective to-be-selected style type; or may be randomly selecting one to-be-selected style type from the plurality of to-be-selected style types as a target style type, etc., which is not specifically limited in the embodiments of the present disclosure.

Optionally, determining the target style type based on type identifiers corresponding to respective to-be-selected style types includes: determining a target type identifier from the type identifiers, and taking the to-be-selected style type corresponding to the target type identifier as the target style type.

The target type identifier may be a maximum identifier in the type identifiers, or may be a minimum identifier in the type identifiers, or may be a type identifier satisfying another predetermined condition, which is not specifically limited in the embodiments of the present disclosure.

In a specific implementation, after the plurality of to-be-selected style types are determined, the type identifiers corresponding to respective to-be-selected style types may be obtained. Further, the target type identifier may be determined from type identifiers according to the first predetermined screening condition. Then, the to-be-selected style type corresponding to the target type identifier may be used as the target style type.

Optionally, determining a target style type based on probability information corresponding to respective to-be-selected style types includes: determining target probability information from the probability information, and taking a to-be-selected style type corresponding to the target probability information as the target style type.

The target probability information may be a maximum value in the probability information, or may be a minimum value in the probability information, or may be probability information meeting another predetermined condition, which is not specifically limited in the embodiments of the present disclosure.

In a specific implementation, after the plurality of to-be-selected style types are determined, probability information corresponding to respective to-be-selected style type may be obtained. Further, target probability information may be determined from the probability information according to a second predetermined screening condition. Further, the to-be-selected style type corresponding to the target probability information may be used as the target style type.

S140: upon detecting the triggering operation for the image effect processing, processing the to-be-processed image into an effect image matching the target style type.

In this embodiment, after the target style type is determined, when a triggering operation for image effect processing is detected, the effect processing may be performed on the to-be-processed image based on the target style type, to process the to-be-processed image into an effect image matching the target style type.

In practical applications, after the target style type is determined, the target style type may be labeled to distinguish the target style type from other to-be-used style types. Further, if a triggering operation for the image effect processing is detected, it may indicate that the effect processing requirement from the user is: continuing to process the to-be-processed image based on the effect item. In this case, the target style type may be retrieved from the to-be-used style types contained in the effect item based on the predetermined identifier, and then the effect processing may be performed on the to-be-processed image based on the target style type, so that the effect presented by the finally obtained effect image matches the effect corresponding to the target style type.

It should be noted that, for the case of performing effect processing on the to-be-processed image by using the effect item for the first time, in order to improve the response speed for effect triggering while improving the matching degree between the effect image and the to-be-processed image, a mapping relationship between the object attributes and the style types may be established after determining the plurality of object attributes and the plurality of style types. Then, when the effect processing is performed on the to-be-processed image for the first time, the style type corresponding to the to-be-processed image may be determined based on a predetermined mapping relationship. Therefore, the effect processing may be performed on the to-be-processed image based on the style type to obtain the effect image.

On the basis of the above technical solutions, the method further includes: when the effect processing is performed on the to-be-processed image for the first time, retrieving a predetermined style type according to an object attribute of a target object in the to-be-processed image; and performing the effect processing on the to-be-processed image according to the predetermined style type to obtain the effect image.

The predetermined style type may be a predetermined style type matching the object attribute. The predetermined style type may be any one of the to-be-used style types, or may be a style type independent of the to-be-used style types, and the style type corresponds to a case in which the effect processing is performed on the to-be-processed image for the first time.

In practical applications, when a triggering operation for the image effect processing is detected, whether the current triggering operation is a triggering operation for performing effect processing on the to-be-processed image for the first time may be determined, according to historical trigger data of the user for the effect item. Further, if it is determined that the effect processing is performed on the to-be-processed image for the first time, target object detection may be performed on the to-be-processed image to determine the target object in the to-be-processed image. Then, object attribute identification may be performed on the target object to determine an object attribute of the target object that is presented in the to-be-processed image. Further, the pre-established mapping relationship between the object attributes and the style types may be traversed according to the object attribute of the target object, to retrieve the predetermined style type corresponding to the object attribute of the target object. Then, the effect processing may be performed on the to-be-processed image according to the predetermined style type to obtain the effect image, so that an effect presented by the effect image matches an effect corresponding to the predetermined style type.

According to the technical solution of the embodiment of the present disclosure, effect processing is performed on a to-be-processed image in response to a triggering operation for the image effect processing to obtain an effect image, and further, if a used style type of the effect image is the same as a used style type of an effect image generated last time, at least one to-be-selected style type is determined based on a predetermined style probability distribution; and a target style type is determined based on the at least one to-be-selected style type; and then, when the triggering operation for the image effect processing is detected, the to-be-processed image is processed into the effect image matching with the target style type. Therefore, the following problem in the prior art is solved: the user repeatedly experiences the same effect since the style types used consecutively may be the same, and thus the user may experience the same effect repeatedly; and when performing the effect processing on an image consecutively, the effect of performing effect processing on the image using different style types is realized, and then the richness and diversity of the effect image are improved. Meanwhile, the effect of keeping the original predetermined style probability distribution unchanged on the basis of randomly generating effect images of various style types is also realized.

Figure 2:
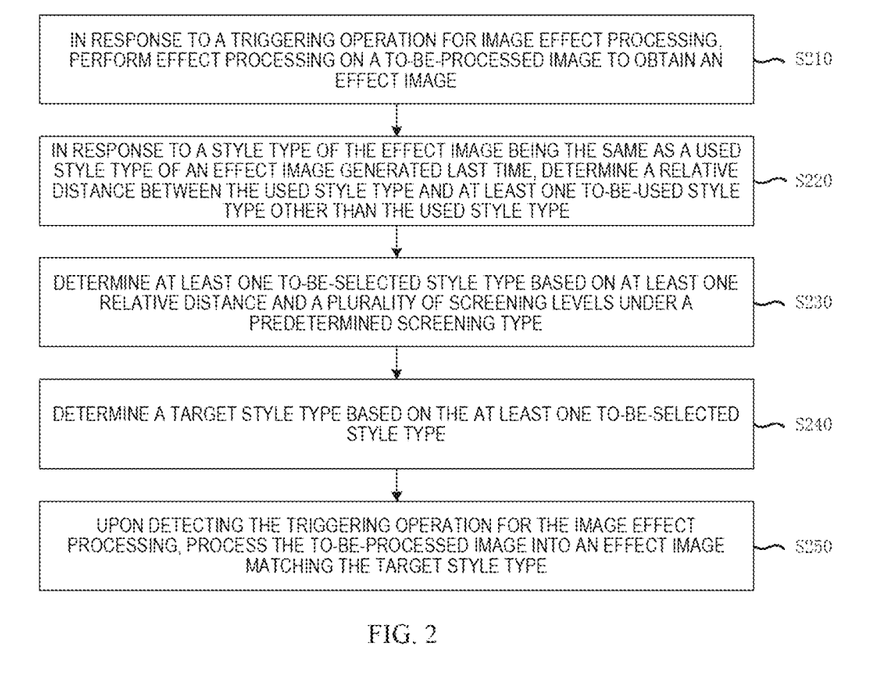
FIG. 2 is a schematic flowchart of a method for image generation according to an embodiment of the present disclosure.

FIG. 2 is a schematic flowchart of a method for image generation according to an embodiment of the present disclosure. Based on the above embodiments, in a case that it is determined that the used style type of the effect image is the same as the used style type of the effect image generated last time, a relative distance between the used style type and at least one to-be-used style type other than the used style type may be determined. Then, at least one to-be-selected style type may be determined according to respective relative distances and a plurality of screening levels under a predetermined screening type. For a specific implementation, the description of this embodiment may be referred to. Technical features that are the same as or similar to those in the foregoing embodiments are not described herein again.

As shown in FIG. 2, the method in this embodiment may specifically include:

S210, in response to a triggering operation for image effect processing, performing effect processing on a to-be-processed image to obtain an effect image.

S220: in response to a style type of the effect image being the same as a used style type of an effect image generated last time, determining at least one to-be-selected style type based on a predetermined style probability distribution.

The to-be-used style type may be another style type other than the used style type in all predetermined style types. The to-be-used style type may be a style type that is not used when two adjacent image effects processing is performed. For example, it is assumed that there are 6 predetermined style types, which are style type 1, style type 2, style type 3, style type 4, style type 5, and style type 6, respectively. If the used style type is style type 1, the to-be-used style types may be style type 2, style type 3, style type 4, style type 5, and style type 6. The relative distance may be understood as information representing a degree of difference in probability values between any two style types. In the embodiment of the present disclosure, the relative distance is determined based on the probability information in the predetermined style probability distribution, that is, the relative distance may be a probability difference between any two style types.

In practical applications, if the used style type of the effect image is the same as the used style type of the effect image generated last time, the plurality of predetermined style types may be divided into the used style type and to-be-used style types other than the used style type. Further, the probability information corresponding to the used style type and the probability information corresponding to each of the to-be-used style types may be determined according to predetermined style probability distribution retrieved in advance. Then, for each to-be-used style type, a difference between the probability information of the current to-be-used style type and the probability information of the used style type may be determined, and the difference is used as the relative distance corresponding to the current to-be-used style type. Further, relative distances corresponding to respective to-be-used style types may be obtained. It should be noted that if the obtained difference of the probability information is a negative value, the absolute value of the difference may be used as the relative distance corresponding to the corresponding to-be-used style type.

Exemplarily, with continued reference to the above example, the probability information corresponding to the style type 1 is 0.08, the probability information corresponding to the style type 2 is 0.15, the probability information corresponding to the style type 3 is 0.21, the probability information corresponding to the style type 4 is 0.19, the probability information corresponding to the style type 5 is 0.25, and the probability information corresponding to the style type 6 is 0.12. If the used style type is style type 1, the to-be-used style types may be style type 2, style type 3, style type 4, style type 5, and style type 6. Then, a relative distance corresponding to the style type 2 may be 0.07 (a difference between 0.15 and 0.08); a relative distance corresponding to the style type 3 may be 0.13 (a difference between 0.21 and 0.08); a relative distance corresponding to the style type 4 may be 0.11 (a difference between 0.19 and 0.08); a relative distance corresponding to the style type 5 may be 0.17 (a difference between 0.25 and 0.08); and a relative distance corresponding to the style type 6 may be 0.04 (a difference between 0.12 and 0.08).

S230, determining the at least one to-be-selected style type based on the at least one relative distance and a plurality of screening levels under the predetermined screening type.

In the embodiment of the present disclosure, after the at least one relative distance is obtained, the at least one to-be-selected style type may be determined based on the at least one relative distance and the plurality of screening levels under the predetermined screening type.

The predetermined screening type may be a type of a predetermined style type screening condition. Optionally, the predetermined screening type may include a first screening type and/or a second screening type, that is, the predetermined screening type may include only the first screening type, or may include only the second screening type, or may include both the first screening type and the second screening type. It should be noted that the screening types included in the predetermined screening types and the number of the screening types may be predetermined in a development stage of the effect item, or may be determined after adjustment in the subsequent update stage of the effect item, which is not specifically limited in the embodiment of the present disclosure.

The first screening type may be any screening type, and optionally, it may be a coarse-grained screening type. The second screening type may be any screening type, and optionally, may be a fine-grained screening type. The screening level may be a predetermined relative distance screening interval. The plurality of screening levels may be obtained through division based on a predetermined value and a predetermined screening step.

It should be noted that different predetermined screening types correspond to different screening levels. Value ranges for the plurality of screening levels under the first screening type are determined from a first predetermined value and a first screening step; and value ranges for the plurality of screening levels under the second screening type are determined from a second predetermined value and a second screening step. The first predetermined value is greater than the second predetermined value, and the first screening step is greater than the second screening step.

Both the first predetermined value and the second predetermined value may be determined based on probability information in a predetermined style probability distribution. The first predetermined value may be any value, and optionally, it may be 0.5. The second predetermined value may be any value less than the first predetermined value, and optionally, it may be 0.2. The first screening step may be a predetermined screening step, and the step may be a step predetermined by the system. The first screening step may be any step, and optionally, may be 0.1. The second screening step may be a predetermined screening step, and the step may also be a step predetermined by the system. The second screening step may be any step less than the first screening step, and optionally, it may be 0.05. For example, assuming that the first predetermined value is 0.5 and the first screening step is 0.1, the value ranges for the plurality of screening levels under the first screening type are [0.5, 0.4), [0.4, 0.3), [0.3, 0.2), [0.2, 0.1), [0.1, 0) respectively; assuming that the second predetermined value is 0.2 and the second screening step is 0.05, the value ranges for the plurality of screening levels under the second screening type are [0.2, 0.15), [0.15, 0.1), [0.1, 0.05), [0.05, 0), respectively.

In practical applications, in a case that the predetermined screening type includes the first screening type, after the at least one relative distance is determined, the at least one relative distance may be traversed in sequence based on a plurality of screening level under the first screening type, to determine whether the relative distance is in value ranges for the screening levels. Further, the to-be-selected style type may be determined according to the traversal result. It should be noted that, since the first predetermined value is greater than the second predetermined value, and the first screening step is greater than the second screening step, when at least one relative distance is traversed based on the plurality of screening levels under the first screening type, and there is one to-be-selected style type finally determined, and this to-be-selected style type is a style type closest to the used style type.

Optionally, the predetermined screening type includes a first screening type, and determining the at least one to-be-selected style type based on the at least one relative distance and the plurality of screening levels under the predetermined screening type includes: sequentially determining whether the at least one relative distance is in the screening levels based on a traversal order corresponding to the plurality of screening levels; in response to a current relative distance being in a first screening level, taking a to-be-used style type corresponding to the current relative distance as the to-be-selected style type; and in response to a next relative distance being in a second screening level and the traversal order of the first screening level is not before the second screening level, updating the to-be-selected style type based on a to-be-used style type corresponding to the next relative distance, and taking the next relative distance as the current relative distance to determine the to-be-selected style type.

The traversal order may be understood as an order of accessing the plurality of screening levels based on the relative distance. The traversal order is positively correlated with values of the screening levels. Exemplarily, the value ranges for the plurality of screening levels are [0.5, 0.4), [0.4, 0.3), [0.3, 0.2), [0.2, 0.1), [0.1, 0) respectively, the traversal order may be sequentially traversing starting from the first value range.

In practical application, in a case that the predetermined screening type includes the first screening type, after the at least one relative distance is obtained, whether the at least one relative distance is in the screening levels may be sequentially determined based on a traversal order corresponding to the plurality of screening levels under the first screening type. Further, for each relative distance, whether the current relative distance is in a screening level is determined based on the traversal order, and if it is detected that the current relative distance is in the first screening level, that is, the current relative distance is in a value range for the first screening level, a to-be-used style type corresponding to the current relative distance may be determined, the style type is used as a to-be-selected style type, and then the to-be-selected style type is stored in a pre-constructed list. Further, whether the next relative distance is in a screening level is determined based on the traversal order, and if it is detected that the next relative distance is in a value range for the second screening level, the traversal order of the second screening level in relative to that of the first screening level where the current relative distance is located may be determined. If the traversal order of the first screening level is not earlier than that of the second screening level, the to-be-used style type corresponding to the next relative distance may be determined, and the to-be-selected style type is updated based on the to-be-used style type corresponding to the next relative distance, to replace the to-be-selected style type with the to-be-used style type corresponding to the next relative distance. Further, the next relative distance may be used as the current relative distance, and the step of determining whether the current relative distance is in a screening level and updating the to-be-selected style type based on the traversal order corresponding to the plurality of screening levels is repeatedly performed, until the current relative distance is the last relative distance in the at least one relative distance, so that the to-be-selected style type obtained at this time may be used as the finally determined to-be-selected style type. The advantage of such a setting is that: a to-be-selected style type closest to the used style type can be determined based on a plurality of screening levels with larger value ranges, so that the effect of determining the to-be-selected style type closest to the used style type on the premise that the predetermined probability distribution is met is achieved, and the fitness between the finally obtained effect image and the target object in the to-be-processed image is improved.

Exemplarily, with continued reference to the foregoing example, the plurality of screening levels include five screening levels, which include a first screening level [0.5, 0.4), a second screening level [0.4, 0.3), a third screening level [0.3, 0.2), a fourth screening level [0.2, 0.1), and a fifth screening level [0.1, 0). The traversal order corresponding to the plurality of screening levels is: a first screening level, a second screening level, a third screening level, a fourth screening level, and a fifth screening level. There are five to-be-used style types, and the relative distances corresponding to the to-be-used style types are respectively: the relative distance corresponding to the style type 2 may be 0.07; the relative distance corresponding to the style type 3 may be 0.13; the relative distance corresponding to the style type 4 may be 0.11; the relative distance corresponding to the style type 5 may be 0.17; and the relative distance corresponding to the style type 6 may be 0.04. Further, whether the five relative distances are in the screening levels is sequentially determined based on the traversal order of the plurality of screening levels, first, it is determined that 0.07 is in the fifth screening level, and the style type 2 may be used as the to-be-selected style type; then, it is determined that 0.13 is in the fourth screening level, and since the traversal order of the fourth screening level is earlier than the fifth screening level, the style type 2 may be continuously used as the to-be-selected style type; then, it is determined that 0.11 is in the fourth screening level, and the style type 2 is continuously used as the to-be-selected style type; then, it is determined that 0.17 is in the fourth screening level, and the style type 2 is continuously used as the to-be-selected style type; and then, it is determined that 0.04 is in the fifth screening level, and since 0.04 is less than 0.07, the to-be-selected style type may be updated based on the style type 6, and the style type 6 is used as the final to-be-selected style type.

S240: determining a target style type based on the at least one to-be-selected style type.

In practical applications, the predetermined screening type includes the first screening type, and the number of the to-be-selected style types obtained after traversing the at least one relative distance sequentially based on the traversal order of the plurality of screening levels under the first screening type is only one. Further, the to-be-selected style type may be used as the target style type.

S250: when a triggering operation for the image effect processing is detected, processing the to-be-processed image into an effect image matching the target style type.

According to the technical solution of the embodiment of the present disclosure, effect processing is performed on a to-be-processed image in response to the triggering operation for the image effect processing to obtain the effect image, and further, if t a used style type of the effect image is the same as a used style type of an effect image generated last time, the relative distances between at least one to-be-used style type other than the used style type and the used style type are determined; then, at least one to-be-selected style type is determined based on at least one relative distance and a plurality of screening levels under a predetermined screening type; then, a target style type is determined based on at least one to-be-selected style type; and finally, when the triggering operation for the image effect processing is detected, the to-be-processed image is processed into the effect image matching the target style type, so that the effect that the finally obtained target style type is closest to the used style type is achieved, and then the effect that fitness between the finally obtained effect image and the target object is relatively high without using the same style type for effect processing consecutively is achieved.

On the basis of the above disclosed embodiments, there may be a case that the predetermined screening type includes the second screening type. In a case that the predetermined screening type includes the second screening type, if the predetermined screening type further includes the first screening type, the at least one relative distance may be screened based on the second screening type after being is screened based on the first screening type. In this case, if the at least one to-be-selected style type is determined after the screening is performed based on the first screening type and the second screening type, the to-be-selected style type determined after the screening is performed based on the first screening type may be removed from a to-be-selected style type list, and thus the to-be-selected style type list includes only the to-be-selected style types determined after the screening is performed based on the second screening type. If the predetermined screening type includes only the second screening type, at least one to-be-selected style type may be directly determined based on the at least one relative distance and the plurality of screening levels under the second screening type.

In the embodiment of the present disclosure, determining the at least one to-be-selected style type based on the at least one relative distance and the plurality of screening levels under the second screening type may include: sequentially determining whether the at least one relative distance is in the screening levels based on a traversal order of the plurality of screening levels; in response to the relative distance being in any of the plurality of screening levels, recording the relative distance, a to-be-processed screening level to which the relative distance belongs, and a to-be-used style type corresponding to the relative distance; and determining a last traversed target screening level from the to-be-processed screening levels according to the traversal order, and taking a to-be-used style type corresponding to at least one relative distance belonging to the target screening level as the to-be-selected style type.

The to-be-processed screening level may be a screening level in which any relative distance is located. The target screening level may be a to-be-processed screening level whose traversal order is the last in the to-be-processed screening levels.

In practical applications, in a case that the predetermined screening type includes the second screening type, the relative distances may be traversed in sequence based on a traversal order of the plurality of screening levels under the second screening type, to determine whether the relative distances are in the screening levels. Further, in a traversal process, if it is determined that a relative distance is in any of the plurality of screening levels, a to-be-processed screening level where the relative distance is located and a to-be-used style type corresponding to the relative distance may be determined, and the relative distance, the to-be-processed screening level where the relative distance is located, and the to-be-used style type corresponding to the relative distance are recorded in a pre-constructed style type list. Further, after traversing respective relative distance is completed, the last traversed to-be-processed screening level may be determined from the recorded to-be-processed screening levels according to the traversal order, and the determined to-be-processed screening level is used as the target screening level. Further, at least one relative distance belonging to the target screening level may be determined, and the to-be-used style type corresponding to this relative distance is used as the to-be-selected style type. The advantage of such a setting lies in that the effect of performing fine-grained screening on the to-be-used style type is achieved, the similarity between the to-be-selected style type and the used style type is improved, and then the fitness between the effect image and the target object is improved.

Exemplarily, with continued reference to the above example, the screening levels under the second screening type includes five screening levels: a first screening level [0.2, 0.15), a second screening level [0.15, 0.1), a third screening level [0.1, 0.05), and a fourth screening level [0.05, 0). Further, after traversing the at least one relative distance, it may be determined that the style type 5 is located at the first screening level, the style type 3 and the style type 4 are located at the second screening level, the style type 2 is located at the third screening level, and the style type 6 is located at the fourth screening level. Further, the fourth screening level is determined as the target screening level, and the style type 6 is used as the to-be-selected style type.

It should be noted that there may be one or more to-be-selected style types determined after screening the at least one relative distance based on the second screening type. If there is one to-be-selected style type, the to-be-selected style type may be used as the target style type. If there are a plurality of to-be-selected style types, the target style type may be randomly determined from the to-be-selected style types. There may be at least two ways for the random determination. Optionally, the random determination may be determinations based on an equal probability or a uniform distribution. For example, if the number of the to-be-selected style types is three, the probabilities of the three to-be-selected style types may be determined according to an equal probability mean, that is, the probabilities are ⅓, ⅓, ⅓, respectively. Then, the target style type may be determined from the three to-be-selected style types. Alternatively, if there are multiple to-be-selected style types, a uniform distribution corresponding to these to-be-selected types may be constructed. Then, the target style type may be determined according to the constructed uniform distribution. Optionally, the random determination may be randomly and arbitrarily selecting one of the plurality of to-be-selected style types as the target style type. It should be noted that the target style type may also be determined in another manner, and optionally, it may be determined based on type identifiers corresponding to respective to-be-selected style types, which is not specifically limited in the embodiments of the present disclosure.

Further, after the target style type is determined, when a triggering operation for image effect processing is detected, the effect processing may be performed on the to-be-processed image based on the target style type, to process the to-be-processed image into an effect image matching the target style type.

Figure 3:
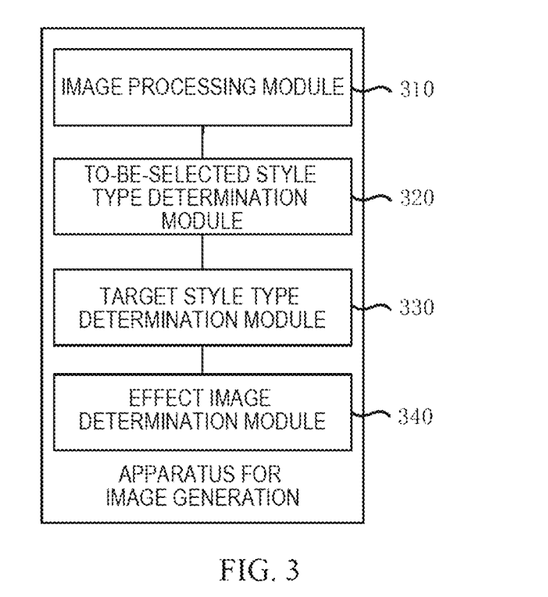
FIG. 3 is a schematic structural diagram of an apparatus for image generation according to an embodiment of the present disclosure.

FIG. 3 is a schematic structural diagram of an apparatus for image generation according to an embodiment of the present disclosure, and as shown in FIG. 3, the apparatus includes: an image processing module 310, a to-be-selected style type determining module 320, a target style type determining module 330, and an effect image determining module 340.

The image processing module 310 is configured to perform, in response to a triggering operation for image effect processing, effect processing on a to-be-processed image to obtain an effect image; the to-be-selected style type determining module 320 is configured to determine, in response to the effect image and a previously generated effect image having the same used style type, at least one to-be-selected style type based on a predetermined style probability distribution; the target style type determining module 330 is configured to determine a target style type based on the at least one to-be-selected style type; and the effect image determining module 340 is configured to process, upon detecting the triggering operation for the image effect processing, the to-be-processed image into an effect image matching the target style type.

Based on the foregoing technical solutions, optionally, the image processing module 310 includes a probability distribution retrieving unit and an effect style type determining unit.

The probability distribution retrieving unit is configured to retrieve a predetermined style probability distribution corresponding to a target object in the to-be-processed image according to an object attribute of the target object;

The effect style type determining unit is configured to determine an effect style type corresponding to the to-be-processed image according to the predetermined style probability distribution, and perform the effect processing on the to-be-processed image based on the effect style type to obtain the effect image.

Based on the foregoing technical solutions, optionally, the to-be-selected style type determining module 320 includes a relative distance determining submodule and a to-be-selected style type determining submodule.

The relative distance determining submodule is configured to determine a relative distance between the used style type and at least one to-be-used style type other than the used style type; where the relative distance is determined based on probability information in the predetermined style probability distribution; and The to-be-selected style type determining sub-module is configured to determine the at least one to-be-selected style type based on at least one relative distance and a plurality of screening levels under a predetermined screening type.

Based on the foregoing technical solutions, optionally, the predetermined screening type comprises a first screening type and/or a second screening type, value ranges for a plurality of screening levels under the first screening type are determined from a first predetermined value and a first screening step, value ranges for a plurality of screening levels under the second screening type are determined from a second predetermined value and a second screening step, the first predetermined value is greater than the second predetermined value, and the first screening step is greater than the second screening step.

Based on the foregoing technical solutions, optionally, the predetermined screening type is the first screening type, and the to-be-selected style type determining submodule includes: a relative distance level screening unit, a to-be-selected style type determining unit, and a to-be-selected style type updating unit.

The relative distance level screening unit is configured to sequentially determine whether the at least one relative distance is in the screening levels based on a traversal order corresponding to the plurality of screening levels, wherein the traversal order is positively correlated with values of the screening levels;

The to-be-selected style type determining unit is configured to: a current relative distance is in a first screening level, take a to-be-used style type corresponding to the current relative distance as the to-be-selected style type;

The to-be-selected style type updating unit is configured to: if a next relative distance is in a second screening level and the traversal order of the first screening level is not earlier than that of the second screening level, update the to-be-selected style type based on a to-be-used style type corresponding to the next relative distance, and take the next relative distance as the current relative distance to determine the to-be-selected style type.

Based on the foregoing technical solutions, optionally, the predetermined screening type is the second screening type, and the to-be-selected style type determining submodule includes: a relative distance level screening unit, a style type recording unit, and a target screening level determining unit.

The relative distance level screening unit is configured to sequentially determine whether the at least one relative distance is in the screening levels based on a traversal order of the plurality of screening levels.

The style type recording unit is configured to record, in response to the relative distance being in any of the plurality of screening levels, the relative distance, a to-be-processed screening level to which the relative distance belongs, and a to-be-used style type corresponding to the relative distance;

The target screening level determining unit is configured to determine a last traversed target screening level from the to-be-processed screening levels according to the traversal order, and take a to-be-used style type corresponding to at least one relative distance belonging to the target screening level as the to-be-selected style type.

Based on the foregoing technical solutions, optionally, the target style type determining module 330 is specifically configured to randomly determining the target style type from the to-be-selected style types, in response to that there are a plurality of to-be-selected style types.

Based on the foregoing technical solutions, optionally, the apparatus further includes a style type retrieving module and an effect processing module.

The style type retrieving module is configured to retrieve a predetermined style type according to an object attribute of a target object in the image to be processed when the effect processing is performed on the image to be processed for the first time.

An effect processing module, configured to process the effect on the to-be-processed image according to the predetermined style type to obtain the effect image.

According to the technical solution of the embodiment of the present disclosure, effect processing is performed on a to-be-processed image in response to the triggering operation for image effect processing to obtain the effect image, and further, if the effect image and a previously generated effect image have the same used style type, at least one to-be-selected style type is determined based on a predetermined style probability distribution; and a target style type is determined based on the at least one to-be-selected style type; and then, when the triggering operation for the image effect processing is detected, the to-be-processed image is processed into the effect image matching with the target style type. Therefore, the following problem in the prior art is solved: the following problem may occur: the user repeatedly experiences the same effect since the style types used consecutively may be the same, and thus the user may experience the same effect repeatedly; and when performing effect processing on images consecutively, the effect of using different style types for performing effect processing on images is realized, and then the richness and diversity of the effect image are improved, and the use experience of the user for the effect item is improved.

The apparatus for image generation provided by the embodiment of the present disclosure can execute the method for image generation provided by any embodiment of the present disclosure, and thus has corresponding functional modules and beneficial effects when implementing the method.

It should be noted that the units and modules included in the above apparatus are divided only according to functional logic, but are not limited to the above division, as long as corresponding functions can be implemented; in addition, the specific names of the functional units are described only for the convenience of distinguishing each other, and are not intended to limit the protection scope of the embodiments of the present disclosure.

Figure 4:
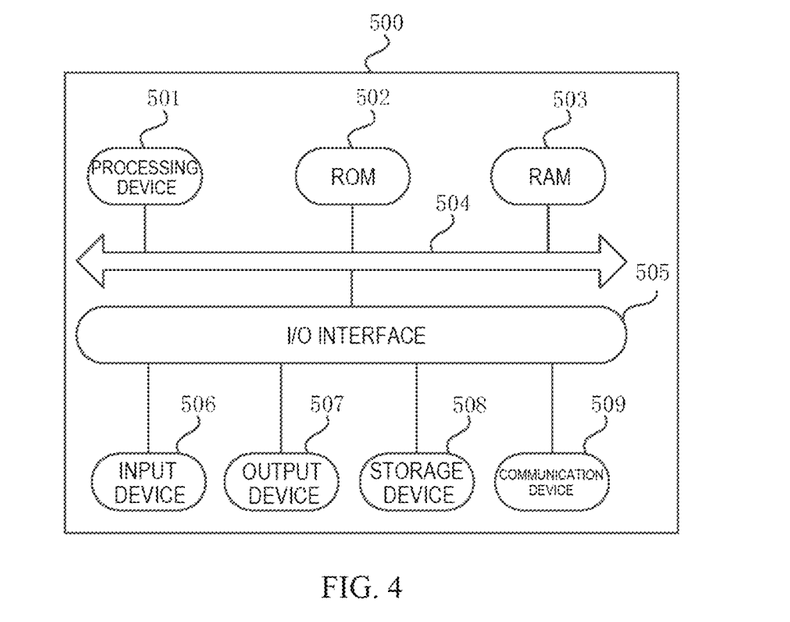
FIG. 4 is a schematic structural diagram of an electronic device according to an embodiment of the present disclosure.

FIG. 4 is a structural schematic diagram of an electronic device provided in an embodiment of the present disclosure. Referring to FIG. 4 below, it is a structural schematic diagram of an electronic device 500 (such as the terminal device or server in FIG. 4) suitable for implementing the embodiment of the present disclosure. The terminal device 500 in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital televisions (TV), desktop computers, etc. The electronic device shown in FIG. 4 is only an example and should not bring any limitation on the functionality and scope of use of the embodiment of the present disclosure.

As shown in FIG. 4, the electronic device 500 may include a processing device (such as a central processing unit, graphics processing unit, etc.) 501, which may perform various appropriate actions and processes based on programs stored in Read-Only Memory (ROM) 502 or loaded from storage device 508 into Random Access Memory (RAM) 503. In the RAM 503, various programs and data necessary for the operation of the electronic device 500 are also stored. The processing device 501, ROM 502, and RAM 503 are connected to each other through a bus 504. An Input/Output I/O interface 505 is also connected to the bus 504.

Typically, the following devices can be connected to I/O interface 505: input devices 506 including, for example, touch screens, touchpads, keyboards, mice, cameras, microphones, accelerometers, gyroscopes, etc.; output devices 507 including liquid crystal displays (LCDs), speakers, vibrators, etc.; storage devices 508 including magnetic tapes, hard disks, etc.; and a communication device 509. The communication device 509 may allow the electronic device 500 to communicate with other devices wirelessly or wirelessly to exchange data. Although FIG. 4 shows an electronic device 500 with a plurality of devices, it shall be understood that it is not required to implement or have all of the devices shown. More or fewer devices can be implemented or provided instead.

In particular, according to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 509, or installed from the storage device 508, or installed from the ROM 502. When the computer program is executed by the processing device 501, the above functions defined in the method of the embodiment of the present disclosure are performed.

The names of the messages or information exchanged between a plurality of devices in the embodiment of the present disclosure are for illustrative purposes only and are not intended to limit the scope of these messages or information.

The electronic device provided in this embodiment of the present disclosure and the method for image generation in an application provided in the above embodiments belongs to the invention idea. Technical details that are not described in detail in this embodiment can be found in the above embodiments, and this embodiment has the same beneficial effect as the above embodiments.

An embodiment of the present disclosure provides a computer storage medium on which a computer program is stored, when being executed by a processor, the program implements the method for image generation in an application provided in the above embodiments.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hyper Text Transfer Protocol), and can be interconnected with any form or medium of digital data communication (such as communication networks). Examples of communication networks include local area networks ("LANs"), wide area networks ("WANs"), inter-networks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: in response to a triggering operation for image effect processing, performing effect processing on a to-be-processed image to obtain an effect image; in response to the effect image and an effect image generated last time having the same used style type, determining at least one to-be-selected style type based on a predetermined style probability distribution; determining a target style type based on the at least one to-be-selected style type; and upon detecting the triggering operation for the image effect processing, processing the to-be-processed image into an effect image matching the target style type.

Computer program codes for performing the operations of the present disclosure may be written in one or more programming languages or a combination thereof, including but not limited to Object Oriented programming languages-such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first obtaining unit may also be described as "a unit for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, [Example 1] provides a method for image generation, comprising:
  in response to a triggering operation for image effect processing, performing effect processing on a to-be-processed image to obtain an effect image;
  in response to a style type of the effect image being the same as a used style type of an effect image generated last time, determining at least one to-be-selected style type based on a predetermined style probability distribution;
  determining a target style type based on the at least one to-be-selected style type; and
  upon detecting the triggering operation for the image effect processing, processing the to-be-processed image into an effect image matching the target style type.

According to one or more embodiments of the present disclosure, [Example 2] provides the method of Example 1, further including:
  optionally, performing the effect processing on the to-be-processed image to obtain the effect image includes: retrieving a predetermined style probability distribution corresponding to a target object in the to-be-processed image according to an object attribute of the target object; and determining an effect style type corresponding to the to-be-processed image according to the predetermined style probability distribution, and performing the effect processing on the to-be-processed image based on the effect style type to obtain the effect image.

According to one or more embodiments of the present disclosure, [Example 3] provides the method of Example 1, further including:
  optionally, determining the at least one to-be-selected style type based on the predetermined style probability distribution includes: determining a relative distance between the used style type and at least one to-be-used style type other than the used style type: wherein the relative distance is determined based on probability information in the predetermined style probability distribution; and determining the at least one to-be-selected style type based on at least one relative distance and a plurality of screening levels under a predetermined screening type.

According to one or more embodiments of the present disclosure, [Example 4] provides the method of Example 3, further including:
  optionally, the predetermined screening type comprises a first screening type and/or a second screening type, value ranges for a plurality of screening levels under the first screening type are determined from a first predetermined value and a first screening step, value ranges for a plurality of screening levels under the second screening type are determined from a second predetermined value and a second screening step, the first predetermined value is greater than the second predetermined value, and the first screening step is greater than the second screening step.

According to one or more embodiments of the present disclosure, [Example 5] provides the method of Example 4, further including:

optionally, the predetermined screening type is the first screening type, and determining the at least one to-be-selected style type based on the at least one relative distance and the plurality of screening levels under the predetermined screening type includes: sequentially determining whether the at least one relative distance is in the screening levels based on a traversal order corresponding to the plurality of screening levels, wherein the traversal order is positively correlated with values of the screening levels; in response to a current relative distance being in a first screening level, taking a to-be-used style type corresponding to the current relative distance as the to-be-selected style type; and in response to a next relative distance being in a second screening level and the traversal order of the first screening level is not earlier than that of the second screening level, updating the to-be-selected style type based on a to-be-used style type corresponding to the next relative distance, and taking the next relative distance as the current relative distance to determine the to-be-selected style type.

According to one or more embodiments of the present disclosure, [Example 6] provides the method of Example 4 or Example 5, further including:

optionally, the predetermined screening type is the second screening type, and determining the at least one to-be-selected style type based on the at least one relative distance and the plurality of screening levels under the predetermined screening type includes: sequentially determining whether the at least one relative distance is in the screening levels based on a traversal order of the plurality of screening levels; in response to the relative distance being in any of the plurality of screening levels, recording the relative distance, a to-be-processed screening level to which the relative distance belongs, and a to-be-used style type corresponding to the relative distance; and determining a last traversed target screening level from the to-be-processed screening levels according to the traversal order, and taking a to-be-used style type corresponding to at least one relative distance belonging to the target screening level as the to-be-selected style type.

According to one or more embodiments of the present disclosure, [Example 7] provides the method of Example 6, further including:

optionally, determining the target style type based on the at least one to-be-selected style type includes: in response to that there are a plurality of to-be-selected style types, randomly determining the target style type from the to-be-selected style types.

According to one or more embodiments of the present disclosure, [Example 8] provides the method of Example 1, further including:

Optionally, the method further includes: when the effect processing is performed on the to-be-processed image for the first time, retrieving a predetermined style type according to an object attribute of a target object in the to-be-processed image; and performing the effect processing on the to-be-processed image according to the predetermined style type to obtain the effect image.

According to one or more embodiments of the present disclosure, [Example 9] provides an apparatus for image generation, including:

an image processing module configured to perform, in response to a triggering operation for image effect processing, effect processing on a to-be-processed image to obtain an effect image;
a to-be-selected style type determining module configured to determine, in response to a style type of the effect image being the same as a used style type of an effect image generated last time, at least one to-be-selected style type based on a predetermined style probability distribution;
a target style type determining module configured to determine a target style type based on the at least one to-be-selected style type; and
an effect image determining module configured to process, upon detecting the triggering operation for the image effect processing, the to-be-processed image into an effect image matching the target style type.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details is included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it shall be understood that the subject matter defined in the appended claims is not necessarily limited to the specific features or actions described above. On the contrary, the specific features and actions described above are merely example forms of implementing the claims.

I claim:

1. A method for image generation, comprising:
in response to a triggering operation for image effect processing, performing effect processing on an image to obtain an effect image;
in response to a style type of the effect image being the same as a used style type of an effect image generated last time, wherein determining at least one to-be-selected style type based on a predetermined style probability distribution comprises:
determining a relative distance between at least one to-be-used style type and the used style type; wherein the relative distance is determined based on probability information in the predetermined style probability distribution; and
determining the at least one to-be-selected style type based on at least one relative distance and a plurality of screening levels under a predetermined screening type, wherein the predetermined screening type comprises at least one of a first screening type or a second screening type, value ranges for a plurality of screening levels under the first screening type are determined from a first predetermined value and a first screening step, value ranges for a plurality of screening levels under the second screening type are determined from a second predetermined value and a second screening step, the first predetermined value is greater than the second predetermined value, and the first screening step is greater than the second screening step;

determining a target style type based on the at least one to-be-selected style type; and upon detecting a triggering operation for the image effect processing, processing the image into an effect image matching the target style type.

2. The method of claim 1, wherein performing the effect processing on the image to obtain the effect image comprises:

retrieving a predetermined style probability distribution corresponding to a target object in the image according to an object attribute of the target object; and determining an effect style type corresponding to the image according to the predetermined style probability distribution, and performing the effect processing on the image based on the effect style type to obtain the effect image.

3. The method of claim 1, wherein the predetermined screening type is the first screening type, and determining the at least one to-be-selected style type based on the at least one relative distance and the plurality of screening levels under the predetermined screening type comprises:

sequentially determining whether the at least one relative distance is in the screening levels based on a traversal order corresponding to the plurality of screening levels, wherein the traversal order is positively correlated with values of the screening levels;

in response to a current relative distance being in a first screening level, taking a to-be-used style type corresponding to the current relative distance as the to-be-selected style type; and in response to a next relative distance being in a second screening level and the traversal order of the first screening level is not earlier than that of the second screening level, updating the to-be-selected style type based on a to-be-used style type corresponding to the next relative distance, and taking the next relative distance as the current relative distance to determine the to-be-selected style type.

4. The method of claim 1, wherein the predetermined screening type is the second screening type, and determining the at least one to-be-selected style type based on the at least one relative distance and the plurality of screening levels under the predetermined screening type comprises:

sequentially determining whether the at least one relative distance is in the screening levels based on a traversal order of the plurality of screening levels;

in response to the relative distance being in any of the plurality of screening levels, recording the relative distance, a screening level to which the relative distance belongs, and a to-be-used style type corresponding to the relative distance; and determining a last traversed target screening level from screening levels based on the traversal order, and taking a to-be-used style type corresponding to at least one relative distance belonging to the target screening level as the to-be-selected style type.

5. The method of claim 4, wherein determining the target style type based on the at least one to-be-selected style type comprises:

in response to that there are a plurality of to-be-selected style types, randomly determining the target style type from the to-be-selected style types.

6. The method of claim 1, further comprising:

when the effect processing is performed on the image for a first time, retrieving a predetermined style type according to an object attribute of a target object in the image; and performing the effect processing on the image according to the predetermined style type to obtain the effect image.

7. An electronic device, comprising:

one or more processors; and a storage device configured to store one or more programs, wherein the one or more programs, when executed by the one or more processors, cause the one or more processors to perform at least:

in response to a triggering operation for image effect processing, performing effect processing on an image to obtain an effect image;

in response to a style type of the effect image being the same as a used style type of an effect image generated last time, wherein determining at least one to-be-selected style type based on a predetermined style probability distribution comprises:

determining a relative distance between at least one to-be-used style type and the used style type; wherein the relative distance is determined based on probability information in the predetermined style probability distribution; and determining at least one to-be-selected style type based on at least one relative distance and a plurality of screening levels under a predetermined screening type, wherein the predetermined screening type comprises at least one of a first screening type or a second screening type, value ranges for a plurality of screening levels under the first screening type are determined from a first predetermined value and a first screening step, value ranges for a plurality of screening levels under the second screening type are determined from a second predetermined value and a second screening step, the first predetermined value is greater than the second predetermined value, and the first screening step is greater than the second screening step;

determining a target style type based on the at least one to-be-selected style type; and upon detecting a triggering operation for the image effect processing, processing the image into an effect image matching the target style type.

8. The electronic device of claim 7, wherein performing the effect processing on the image to obtain the effect image comprises:

retrieving a predetermined style probability distribution corresponding to a target object in the image according to an object attribute of the target object; and determining an effect style type corresponding to the image according to the predetermined style probability distribution, and performing the effect processing on the image based on the effect style type to obtain the effect image.

9. The electronic device of claim 7, wherein the predetermined screening type is the first screening type, and determining the at least one to-be-selected style type based on the at least one relative distance and the plurality of screening levels under the predetermined screening type comprises:
sequentially determining whether the at least one relative distance is in the screening levels based on a traversal order corresponding to the plurality of screening levels, wherein the traversal order is positively correlated with values of the screening levels;
in response to a current relative distance being in a first screening level, taking a to-be-used style type corresponding to the current relative distance as the to-be-selected style type; and
in response to a next relative distance being in a second screening level and the traversal order of the first screening level is not earlier than that of the second screening level, updating the to-be-selected style type based on a to-be-used style type corresponding to the next relative distance, and taking the next relative distance as the current relative distance to determine the to-be-selected style type.

10. The electronic device of claim 7, wherein the predetermined screening type is the second screening type, and determining the at least one to-be-selected style type based on the at least one relative distance and the plurality of screening levels under the predetermined screening type comprises:
sequentially determining whether the at least one relative distance is in the screening levels based on a traversal order of the plurality of screening levels;
in response to the relative distance being in any of the plurality of screening levels, recording the relative distance, a screening level to which the relative distance belongs, and a to-be-used style type corresponding to the relative distance; and
determining a last traversed target screening level from screening levels based on the traversal order, and taking a to-be-used style type corresponding to at least one relative distance belonging to the target screening level as the to-be-selected style type.

11. The electronic device of claim 10, wherein determining the target style type based on the at least one to-be-selected style type comprises:
in response to that there are a plurality of to-be-selected style types, randomly determining the target style type from the to-be-selected style types.

12. The electronic device of claim 7, further comprising:
when the effect processing is performed on the image for a first time, retrieving a predetermined style type according to an object attribute of a target object in the image; and
performing the effect processing on the image according to the predetermined style type to obtain the effect image.

13. A non-transitory storage medium comprising computer-executable instructions, wherein the computer-executable instructions, when executed by a computer processor, are configured to perform at least:
in response to a triggering operation for image effect processing, performing effect processing on an image to obtain an effect image;
in response to a style type of the effect image being the same as a used style type of an effect image generated last time, wherein determining at least one to-be-selected style type based on a predetermined style probability distribution comprises:
determining a relative distance between at least one to-be-used style type and the used style type, wherein the relative distance is determined based on probability information in the predetermined style probability distribution; and
determining at least one to-be-selected style type based on at least one relative distance and a plurality of screening levels under a predetermined screening type, wherein the predetermined screening type comprises at least one of a first screening type or a second screening type, value ranges for a plurality of screening levels under the first screening type are determined from a first predetermined value and a first screening step, value ranges for a plurality of screening levels under the second screening type are determined from a second predetermined value and a second screening step, the first predetermined value is greater than the second predetermined value, and the first screening step is greater than the second screening step;
determining a target style type based on the at least one to-be-selected style type; and
upon detecting a triggering operation for the image effect processing, processing the image into an effect image matching the target style type.

14. The non-transitory storage medium of claim 13, wherein performing the effect processing on the image to obtain the effect image comprises:
retrieving a predetermined style probability distribution corresponding to a target object in the image according to an object attribute of the target object, and
determining an effect style type corresponding to the image according to the predetermined style probability distribution, and performing the effect processing on the image based on the effect style type to obtain the effect image.

* * * * *